(12) United States Patent
d'Angelo et al.

(10) Patent No.: US 9,247,607 B2
(45) Date of Patent: *Jan. 26, 2016

(54) SINGLE WIRE SERIAL INTERFACE UTILIZING COUNT OF ENCODED CLOCK PULSES WITH RESET

(71) Applicant: Skyworks Solutions, Inc., Woburn, MA (US)

(72) Inventors: Kevin P. d'Angelo, Santa Clara, CA (US); David Alan Brown, Los Gatos, CA (US); John Sung K. So, Fremont, CA (US); Jan Nilsson, Sunnyvale, CA (US); Richard K. Williams, Cupertino, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,897

(22) Filed: Oct. 15, 2014

(65) Prior Publication Data

US 2015/0028777 A1 Jan. 29, 2015

Related U.S. Application Data

(63) Continuation of application No. 14/028,365, filed on Sep. 16, 2013, which is a continuation of application No. 13/028,139, filed on Feb. 15, 2011, now Pat. No. 8,539,275, which is a continuation of application No.

(Continued)

(51) Int. Cl.
*G06F 1/00* (2006.01)
*G06F 1/12* (2006.01)
(Continued)

(52) U.S. Cl.
CPC .............. *H05B 33/0851* (2013.01); *G06F 1/06* (2013.01); *G06F 1/22* (2013.01); *G06F 13/4291* (2013.01);
(Continued)

(58) Field of Classification Search
None
See application file for complete search history.

(56) References Cited

U.S. PATENT DOCUMENTS 231,013 A 8/1880 Powers
447,918 A 3/1891 Strowger
(Continued)

FOREIGN PATENT DOCUMENTS

CN 1639672 7/2005
CN 1311318 4/2007
(Continued)

OTHER PUBLICATIONS

Dallas Semiconductor "DS1WM Synthesizable 1-Wire Bus Master." Available at http://pdfserv.maxim-ic.com/arpdf/DS1WM.pdf. Publication date unknown. Attached.

(Continued)

*Primary Examiner* — Ji H Bae
(74) *Attorney, Agent, or Firm* — Knobbe, Martens, Olson & Bear, LLP

(57) ABSTRACT

A single wire serial interface for power ICs and other devices is provided. To use the interface, a device is configured to include an EN/SET input pin. A counter within the device counts clock pulses sent to the EN/SET input pin. The output of the counter is passed to a ROM or other decoder circuit. The ROM selects an operational state for the device that corresponds to the value of the counter. In this way, control states may be selected for the device by sending corresponding clock pulses to the EN/SET pin. Holding the EN/SET pin high causes the device to maintain its operational state. Holding the EN/SET pin low for a predetermined timeout period resets the counter and causes the device to adopt a predetermined configuration (such as off) until new clock pulses are received at the EN/SET pin.

29 Claims, 4 Drawing Sheets

Related U.S. Application Data

11/582,927, filed on Oct. 17, 2006, now Pat. No. 7,921,320, which is a continuation of application No. 10/144,333, filed on May 13, 2002, now Pat. No. 7,127,631.

(60) Provisional application No. 60/368,474, filed on Mar. 28, 2002.

(51) Int. Cl.
| | |
|---|---|
| G06F 1/04 | (2006.01) |
| H03K 23/00 | (2006.01) |
| G09G 5/10 | (2006.01) |
| H05B 33/08 | (2006.01) |
| G09G 3/34 | (2006.01) |
| G06F 1/22 | (2006.01) |
| G06F 13/42 | (2006.01) |
| G06F 1/06 | (2006.01) |

(52) U.S. Cl.
CPC ............... *G09G 3/3406* (2013.01); *G09G 5/10* (2013.01); *H05B 33/0803* (2013.01); *H05B 33/0815* (2013.01); *G06F 1/04* (2013.01); *G06F 1/12* (2013.01); *G09G 2320/0233* (2013.01)

(56) References Cited

U.S. PATENT DOCUMENTS

| | | |
|---|---|---|
| 540,168 A | 5/1895 | Keith |
| 597,062 A | 1/1898 | Keith et al. |
| 1,231,013 A | 6/1917 | Goodrum |
| 2,136,630 A | 11/1938 | Massonneau |
| 2,149,343 A | 3/1939 | Hubbard |
| 2,724,020 A | 11/1955 | Judy |
| 3,387,270 A | 6/1968 | Adhoch et al. |
| 3,492,434 A | 1/1970 | Michel |
| 3,544,803 A | 12/1970 | Taylor |
| 3,698,631 A | 10/1972 | Drechsler |
| 3,814,861 A | 6/1974 | Robbins |
| 3,845,473 A | 10/1974 | Kawashima |
| 3,889,236 A | 6/1975 | Herger et al. |
| 3,940,567 A | 2/1976 | Iki et al. |
| 3,968,401 A | 7/1976 | Bryant |
| 3,993,877 A | 11/1976 | Sendyk et al. |
| 4,036,762 A | 7/1977 | Troetscher et al. |
| 4,060,735 A | 11/1977 | Pascucci et al. |
| 4,085,403 A | 4/1978 | Meier et al. |
| 4,114,366 A | 9/1978 | Renner et al. |
| 4,155,084 A | 5/1979 | Klees |
| 4,208,717 A | 6/1980 | Rush |
| 4,215,246 A | 7/1980 | Sawyer |
| 4,254,304 A | 3/1981 | Fulghum et al. |
| 4,303,915 A | 12/1981 | D'Angelo et al. |
| 4,304,989 A | 12/1981 | Vos et al. |
| 4,310,828 A | 1/1982 | Baker |
| 4,314,828 A | 2/1982 | Saito et al. |
| 4,328,482 A | 5/1982 | Belcher et al. |
| 4,366,738 A | 1/1983 | Howell |
| 4,404,644 A | 9/1983 | Howie |
| 4,465,956 A | 8/1984 | Fowler |
| 4,511,892 A | 4/1985 | Grothe |
| 4,559,536 A | 12/1985 | Olesen et al. |
| 4,625,205 A | 11/1986 | Relis |
| 4,656,620 A | 4/1987 | Cox |
| 4,672,374 A | 6/1987 | Desjardins |
| 4,675,864 A | 6/1987 | Bliek et al. |
| 4,700,367 A | 10/1987 | Kawazoe et al. |
| 4,734,861 A | 3/1988 | Bertolasi et al. |
| 4,788,527 A | 11/1988 | Johansson |
| 4,847,648 A | 7/1989 | Yamaguchi et al. |
| 4,876,653 A | 10/1989 | McSpadden et al. |
| 4,914,680 A | 4/1990 | Tanno et al. |
| 4,958,915 A | 9/1990 | Okada et al. |
| 5,146,240 A | 9/1992 | Hayashi et al. |
| 5,168,511 A | 12/1992 | Boles |
| 5,210,846 A | 5/1993 | Lee |
| 5,248,919 A | 9/1993 | Hanna et al. |
| 5,277,497 A | 1/1994 | Enomoto |
| 5,319,453 A | 6/1994 | Copriviza et al. |
| 5,319,601 A | 6/1994 | Kawata et al. |
| 5,412,644 A | 5/1995 | Herberle |
| 5,455,681 A | 10/1995 | Ng |
| 5,508,650 A | 4/1996 | Grimm et al. |
| 5,593,430 A | 1/1997 | Renger |
| 5,623,286 A | 4/1997 | Morimoto et al. |
| 5,666,893 A | 9/1997 | Bourgeois |
| 5,758,105 A | 5/1998 | Kelley et al. |
| 5,807,283 A | 9/1998 | Ng |
| 5,822,369 A | 10/1998 | Araki |
| 5,826,068 A | 10/1998 | Gates |
| 5,844,540 A | 12/1998 | Terasaki |
| 5,914,700 A | 6/1999 | Tonosaki |
| 5,996,079 A | 11/1999 | Klein |
| 6,020,865 A | 2/2000 | Okuda et al. |
| 6,020,879 A | 2/2000 | Nakabayashi |
| 6,034,955 A | 3/2000 | Cho |
| 6,049,358 A | 4/2000 | Jun |
| 6,054,782 A | 4/2000 | Girard et al. |
| 6,141,764 A | 10/2000 | Ezell |
| 6,205,182 B1 | 3/2001 | Pardini et al. |
| 6,215,817 B1 | 4/2001 | Kimura |
| 6,249,480 B1 | 6/2001 | Mick |
| 6,298,066 B1 | 10/2001 | Wettroth et al. |
| 6,327,462 B1 | 12/2001 | Loke et al. |
| 6,397,077 B1 | 5/2002 | Jensen |
| 6,429,858 B1 | 8/2002 | Janssen et al. |
| 6,487,674 B1 | 11/2002 | White et al. |
| 6,586,890 B2 | 7/2003 | Min et al. |
| 6,614,862 B1 | 9/2003 | Doblar |
| 6,651,129 B1 | 11/2003 | Smith et al. |
| 6,674,846 B1 | 1/2004 | Stevens |
| 6,694,130 B2 | 2/2004 | Loke et al. |
| 6,714,888 B2 | 3/2004 | Mori et al. |
| 6,717,565 B1 | 4/2004 | Kurosawa et al. |
| 6,724,150 B2 | 4/2004 | Maruyama et al. |
| 6,765,560 B1 | 7/2004 | Ozawa |
| 6,772,021 B1 | 8/2004 | Fuller |
| 6,900,721 B1 | 5/2005 | Urbas et al. |
| 6,950,440 B1 | 9/2005 | Conway |
| 6,954,511 B2 | 10/2005 | Tachimori |
| 7,000,140 B2 | 2/2006 | Okubo et al. |
| 7,039,150 B1 | 5/2006 | Drori |
| 7,052,178 B2 | 5/2006 | Urbas et al. |
| 7,080,266 B2 * | 7/2006 | D'Angelo et al. ............ 713/300 |
| 7,127,631 B2 * | 10/2006 | D'Angelo et al. ............ 713/502 |
| 7,921,320 B2 * | 4/2011 | D'Angelo et al. ............ 713/502 |
| 8,539,275 B2 * | 9/2013 | D'Angelo et al. ............ 713/500 |
| 9,015,515 B2 * | 4/2015 | d'Angelo et al. ............ 713/500 |
| 2002/0039891 A1 | 4/2002 | Loke et al. |
| 2002/0047642 A1 | 4/2002 | Miyagawa |
| 2002/0051508 A1 | 5/2002 | Tachimori |
| 2002/0107654 A1 | 8/2002 | Mori et al. |
| 2002/0123255 A1 | 9/2002 | Kertesz |
| 2002/0149320 A1 | 10/2002 | Maruyama et al. |
| 2003/0102819 A1 | 6/2003 | Min et al. |
| 2003/0188202 A1 | 10/2003 | D'Angelo et al. |
| 2003/0212918 A1 | 11/2003 | D'Angelo et al. |
| 2005/0169345 A1 | 8/2005 | Urbas et al. |
| 2014/0089722 A1 | 3/2014 | D'Angelo et al. |
| 2015/0028771 A1 | 1/2015 | D'Angelo et al. |

FOREIGN PATENT DOCUMENTS

| | | |
|---|---|---|
| EP | 0545828 | 6/1993 |
| EP | 1488307 | 12/2004 |
| JP | 58-056504 | 4/1983 |
| JP | 2-119019 | 5/1990 |
| JP | 05-35208 | 2/1993 |
| JP | 06-62468 | 3/1994 |
| JP | 1995-107021 | 4/1995 |
| JP | H7-20636 U | 4/1995 |
| JP | H0720363 | 4/1995 |
| JP | 09-101759 | 4/1997 |

(56) References Cited

FOREIGN PATENT DOCUMENTS

| JP | H9-101759 A | 4/1997 |
|---|---|---|
| JP | 63-196103 | 8/1998 |
| JP | 2005521944 | 7/2005 |
| KR | 9403509 | 4/1994 |
| KR | 0138347 | 2/1995 |
| KR | 1995-0008788 B1 | 8/1995 |
| KR | 950008788 | 8/1995 |
| KR | 0138347 B1 | 2/1998 |
| KR | 2001-0064409 | 7/2001 |
| KR | 10-2004-0096627 | 11/2004 |
| WO | WO 03/083677 | 10/2003 |

OTHER PUBLICATIONS

"16 and 20 Bit, 8•Pin 8.LADC," Crystal CS5510/11!12/13, Cirrus Logic, Inc., Austin, Texas, marked 2000, pp. 1-25.
AATI's Disclosure of Asserted Claims and Preliminary Infringement Contentions (Patent L.R. 3-1) and Accompanying Document Production (L.R. 3-2) (including infringement contention charts attached as Exhibits 1-10), served Aug. 18, 2009 Subject to Protective Order, filed separately in a sealed envelope.
AATI' s Response to Kinetic Technologies, Inc.' s Answer and Counterclaim s to First Amended Complaint, filed by Advanced Analogic Technologies, Inc. on Aug. 26, 2009.
Advanced Analogic Technologies, Inc.'s Notice of Initial Disclosure Pursuant to Fed.RCi v.P. 26(a)(1), served Jun. 5, 2009.
Advanced Analogic Technologies, Inc. 's Preliminary Claim Constructions and Extrinsic Evidence Pursuant to L.R. 4-2, served Nov. 2, 2009.
Advanced Analogic Technologies, Inc.'s Statement of Claims, dated Feb. 20, 2009.
Arbitrator's Order on Disputed Discovery Issues, dated Mar. 25, 2009.
Advisory Action mailed Aug. 26, 2005 for U.S. Appl. No. 10/144,333.
Amendment and Response filed Oct. 25, 2005 for U.S. Appl. No. 10/144,333.
Answer and Counterclaims to First Amended Complaint, filed by Kinetic Technologies, Inc. on Aug. 7, 2009.
Bates, Regis et al., Voice and Data Communications Handbook, McGraw Hill, New York, 1997, pp. 7-12.
Bates, Regis et al., Voice and Data Communications Handbook, McGraw Hill, New York, 1997, pp. 50-69.
Claim of Kin Shum and Kinetic Technologies, Inc., dated Feb. 20, 2009.
Complaint for Patent Infringement, filed by Advanced Analogic Technologies, Inc. on Mar. 27, 2009, without exhibits.
Complaint for Misappropriation of Trade Secrets, filed Sep. 5, 2008.
"Decade Counter With 10 12oded Outputs," HCF4017B, STMicroelectronics, Italy, marked Sep. 2001, pp. 1-11.
Defendant Kinetic Technologies, Inc.'s Exchange of Preliminary Claim Construction Pursuant to Patent L.R. 4-2, served Nov. 2, 2009.
Defendant Kinetic Technologies, Inc.'s Invalidity Contentions Pursuant to Patent L.R. 3-3, served Oct. 5, 2009.
Defendant Kinetic Technologies, Inc.'s Rule 26(A) Initial Disclosures, served Jul. 21, 2009.
Dwyer, David, Understanding Data Communications, Sixth Edition, New Riders Publishing, Indianapolis, IN, 1999, pp. 83-85.
Examiner-Initiated Interview Summary Record dated Feb. 1, 2006 for U.S. Appl. No. 10/447,764.
Final Office Action mailed May 26, 2005 for U.S. Appl. No. 10/144,333.
First Amended Complaint for Patent Infringement, filed by Advanced Analogic Technologies, Inc. on Jul. 24, 2009, without exhibits.
"Interfacing the Maxim I-Wire Master (DS 1 WM) to an ARM7 Processor," Application Note 145, Maxim Integrated Products, Sunnyvale, CA, marked Jul. 5, 2001, pp. 1-3.
Joint Claim Construction and Prehearing Statement Pursuant to Patent L.R. 4-3 (including attached Exhibits A-C), filed Nov. 30, 2009.
Korean Patent Application No. 10-2004-7013451, English Translation of Claims Pending, dated Dec. 4, 2009.
Korean Patent Application No. 10-2004-7013451, Korean Intellectual Property Office Notice of Preliminary Rejection, mailed Oct. 30, 2009 (Korean Language).
Non-final Office Action mailed Jan. 10, 2005 for U.S. Appl. No. 10/144,333.
Non-final Office Action mailed Dec. 27, 2005 for U.S. Appl. No. 10/144,333.
Non-Final Office Action dated Nov. 16, 2005 for U.S. Appl. No. 10/447,764.
Non-Final Office Action, dated Jan. 16, 2008 for U.S. Appl. No. 11/582,927.
Notice of Entry of Order and Judgment, dated Feb. 2, 2010.
Notice of Allowance and Notice of Allowability dated Mar. 9, 2006 for U.S. Appl. No. 10/447,764.
Notice of Allowance mailed Jun. 9, 2006 for U.S. Appl. No. 10/144,333.
Notice of Prior or Concurrent Proceedings, filed Mar. 9, 2010 for U.S. Appl. No. 10/144,333.
Office Action in Inter Partes Reexamination U.S. Appl. No. 95/000,501, to U.S. Pat. No. 7,127,631, parent of current application, dated Oct. 4, 2010.
Order Granting Petition to Compel Arbitration, dated Feb. 10, 2009.
Order Granting Request for Inter Partes Reexamination, mailed Dec. 29, 2009.
PCT/US2003/009636, International Search Report, mailed Sep. 30, 2003.
Request for Inter Partes Reexamination, filed Oct. 3, 2009 for U.S. Appl. No. 10/144,333.
Response and Amendment dated Feb. 2, 2006 for U.S. Appl. No. 10/447,764.
Response to Non-final Office Action mailed Jan. 10, 2005 for U.S. Appl. No. 10/144,333.
Response to Non-final Office Action mailed Dec. 27, 2005 for U.S. Appl. No. 10/144,333.
Response to Final Office Action mailed May 26, 2005 for U.S. Appl. No. 10/144,333.
"S3CA400AOI Microprocessor Companion Chip, I-Wire Bus Master (Preliminary)," Samsung Electronics, Korea, marked Dec. 7, 2001, pp. 10-1 through 10-10.
"SX Reset Considerations," Application Note 18. Zafar Ullah, Ubicom, Inc., Mountain View, CA, marked Nov. 2000.
The Encyclopedia Britannica, A Dictionary of Arts, Sciences, Literature and General Information. Eleventh Edition, vol. XXVI, Encyclopedia Britannica, Inc., New York, pp. 547-557. Eleventh edition (published 1911).
"Using an API to Control the DSIWM I-Wire® Bus Master," Application Note 120, Maxim Integrated Products, Sunnyvale, CA, marked Mar. 8, 2002, pp. 1-8.
"Using a UART to Implement a I-Wire Bus Master," Application Note 2]4, Maxim Integrated Products, Sunnyvale, CA, marked Sep. 10,2002, pp. 1-10.
Web page relating to "Book ofiButton® Standards," Application Note 937, Maxim Integrated Products, Sunnyvale, CA, marked Jan. 16, 2002, pp. 1-2.
Order Granting Request for Inter Partes Reexamination, mailed Dec. 29, 2009 for U.S. Appl. No. 10/144,333.
Affidavit of Chun Lu in support of Counter Simulation; dated Apr. 16, 2014.
Counter Example, Prior art for Element A; not dated.
Mano; "Digital Design"; Second Edition; Chapter 6-Synchronous Sequential Logic; dated 1991.
Mano; "Digital Design"; Third Edition; Chapter 6-Registers and Counters; dated 2002.
3113 4×3 Dual, Mar. 15, 2002, Skyworks Exhibit 2014.
3113 4×4 Quad, Mar. 15, 2002, Skyworks Exhibit 2013.
AATI Server (Z_) Directory Listing, Skyworks Exhibit 2009.
AATI'S and KTI'S Designations of Most Significant Terms Pursuant to Patent L.R. 4-3 (c), Exhibit C, filed Nov. 30, 2009, in Advanced Analogic Technologies, Inc. v. Kinetic Technologies, Inc., Case No. 3:09-CV-01360 in the United States District Court for the Northern District of California.

(56) References Cited

OTHER PUBLICATIONS

AATI'S and KTI'S Proposed Constructions and Support Pursuant to Patent L.R. 4-3 (b), Exhibit B, filed Nov. 30, 2009, in Advanced Analogic *Technologies, Inc.* v. *Kinetic Technologies, Inc.*, Case No. 3:09-CV-01360 in the United States District Court for the Northern District of California.
AATI's Response to Kinetic Technologies, Inc.'s Answer and Counterclaims to First Amended Complaint, filed Aug. 26, 2009, in *Advanced Analogic Technologies, Inc.* v. *Kinetic Technologies, Inc.*, Case No. 3:09-CV-01360 in the United States District Court for the Northern District of California.
AATI3113 rev. C Datasheet, Dec. 19, 2001, Skyworks Exhibit 2011.
Certified Assignment Recorded on May 27, 2013, Skyworks Exhibit 2017.
Certified U.S. Appl. No. 60/368,474, filed Mar. 28, 2002, Skyworks Exhibit 2016.
Comparison of Exhibit 1008, Declaration of Prasant Mohapatra, to Paper 1, Petition for Inter Partes Review, Skyworks Exhibit 2027.
Original Infringement Contentions (KTD101 Datasheet), Exhibit CC, filed Oct. 17, 2014, in *Skyworks Solutions, Inc.* v. *Kinetic Technologies, Inc.*, Case No. 3:14-CV-00010 in the United States District Court for the Northern District of California.
Original Infringement Contentions (KTD102 Datasheet), Exhibit DD, filed Oct. 17, 2014, in *Skyworks Solutions, Inc.* v. *Kinetic Technologies, Inc.*, Case No. 3:14-CV-00010 in the United States District Court for the Northern District of California.
Original Infringement Contentions (KTD253 Datasheet), Exhibit EE, filed Oct. 17, 2014, in *Skyworks Solutions, Inc.* v. *Kinetic Technologies, Inc.*, Case No. 3:14-CV-00010 in the United States District Court for the Northern District of California.
Original Infringement Contentions (KTD259 Datasheet), Exhibit FF, filed Oct. 17, 2014, in *Skyworks Solutions, Inc.* v. *Kinetic Technologies, Inc.*, Case No. 3:14-CV-00010 in the United States District Court for the Northern District of California.
Original Infringement Contentions (KTD262 Datasheet), Exhibit GG, filed Oct. 17, 2014, in *Skyworks Solutions, Inc.* v. *Kinetic Technologies, Inc.*, Case No. 3:14-CV-00010 in the United States District Court for the Northern District of California.
Patent Owner's Response to Petition for Inter Partes Review, filed Jan. 16, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275.
Petition for Inter Partes Review of U.S. Pat. No. 7,921,320 under 35 USC § 311-319 and 37 CFR §42.100 ET SEQ., dated Mar. 21, 2014, in *Kinetic Technologies, Inc.* v. *Skyworks Solutions, Inc.*, United States Patent and Trademark Office before the Patent Trial and Appeal Board, U.S. Pat. No. 7,921,320 (60 pages).
Petition for Inter Partes Review of U.S. Pat. No. 7,921,320 under 35 USC § 311-319 and 37 CFR §42.100 ET SEQ., dated Mar. 21, 2014, in *Kinetic Technologies, Inc.* v. *Skyworks Solutions, Inc.*, United States Patent and Trademark Office before the Patent Trial and Appeal Board, U.S. Pat. No. 7,921,320 (66 pages).
Petition for Inter Partes Review of U.S. Pat. No. 8,539,275 under 35 USC § 311-319 and 37 CFR §42.100 ET SEQ., dated Apr. 25, 2014, in *Kinetic Technologies, Inc.* v. *Skyworks Solutions, Inc.*, United States Patent and Trademark Office before the Patent Trial and Appeal Board, U.S. Pat. No. 8,539,275.
Plaintiff Skyworks Solution, Inc.'s Complaint for Patent Infringement and Demand for Jury Trial, filed Jan. 2, 2014, in *Skyworks Solutions, Inc.* v. *Kinetic Technologies, Inc.*, Case No. 5:14-CV-00010 in the United States District Court for the Northern District of California.
Plaintiff Skyworks Solution, Inc.'s First Amended Complaint for Patent Infringement; Demand for Jury Trial, filed Feb. 7, 2014, in *Skyworks Solutions, Inc.* v. *Kinetic Technologies, Inc.*, Case No. 3:14-CV-00010 in the United States District Court for the Northern District of California.
Plaintiff Skyworks Solutions Inc.'s Reply Claim Construction Brief, filed Jan. 28, 2015, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Disclosure of Asserted Claims and Preliminary Infringement Contentions and Document Production, Exhibit HH, pp. 1-150, filed Oct. 17, 2014, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Disclosure of Asserted Claims and Preliminary Infringement Contentions and Document Production, Exhibit HH, pp. 151-300, filed Oct. 17, 2014, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Disclosure of Asserted Claims and Preliminary Infringement Contentions and Document Production, Exhibit HH, pp. 301-450, filed Oct. 17, 2014, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Disclosure of Asserted Claims and Preliminary Infringement Contentions and Document Production, Exhibit HH, pp. 451-600, filed Oct. 17, 2014, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Disclosure of Asserted Claims and Preliminary Infringement Contentions and Document Production, Exhibit HH, pp. 601-741, filed Oct. 17, 2014, in *Skyworks Solutions, Inc.* v. *Kinetic Technologies, Inc.*, Case No. 3:14-CV-00010 in the United States District Court for the Northern District of California.
Plaintiff Skyworks Solutions, Inc.'s Opening Claim Construction Brief, filed Nov. 10, 2014, in *Skyworks Solutions, Inc.* v. *Kinetic Technologies, Inc.*, Case No. 3:14-CV-00010 in the United States District Court for the Northern District of California.
Redacted AATI3113 IDAC Current DAC LED Driver Design Review Package, Jan. 16, 2002, Skyworks Exhibit 2012.
Skyworks Solutions, Inc.'s Exhibit List, filed Jan. 16, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275.
Skyworks Solutions, Inc.'s Exhibit List, filed Jul. 29, 2014, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539, 275.
Skyworks Solutions, Inc.'s Exhibit List, filed Jul. 30, 2014, in *Kinetic Technologies, Inc.* v. *Skyworks Solutions, Inc.*, United States Patent and Trademark Office before the Patent Trial and Appeal Board, Case No. IPR2014-00529, U.S. Pat. No. 7,921,320.
Skyworks Solutions, Inc.'s Exhibit List, filed Jul. 30, 2014, in *Kinetic Technologies, Inc.* v. *Skyworks Solutions, Inc.*, United States Patent and Trademark Office before the Patent Trial and Appeal Board, Case No. IPR2014-00530, U.S. Pat. No. 7,921,320.
Skyworks Solutions, Inc.'s Preliminary Response to Petition, filed Jul. 1, 2014, in *Kinetic Technologies, Inc.* v. *Skyworks Solutions, Inc.*, United States Patent and Trademark Office before the Patent Trial and Appeal Board, Case No. IPR2014-00529, U.S. Pat. No. 7,921,320.
Skyworks Solutions, Inc.'s Preliminary Response to Petition, filed Jul. 1, 2014, in *Kinetic Technologies, Inc.* v. *Skyworks Solutions, Inc.*, United States Patent and Trademark Office before the Patent Trial and Appeal Board, Case No. IPR2014-00530, U.S. Pat. No. 7,921,320.
Skyworks Solutions, Inc.'s Preliminary Response to Petition, filed Jul. 29, 2014, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275.
XFab Fabrication Form, Mar. 22, 2002, Skyworks Exhibit 2015.
Complaint for Patent Infringement, filed Mar. 20, 2013, in *Skyworks Solutions, Inc.* v. *Kinetic Technologies, Inc.*, Case No. 1:13-CV-10655 in the United States District Court for the District of Massachusetts.

(56) References Cited

OTHER PUBLICATIONS

Decision Denying Institution of Inter Partes Review of U.S. Pat. No. 7,921, 320, entered Sep. 23, 2014, in *Kinetic Technologies, Inc.* v. *Skyworks Solutions, Inc.*, United States Patent and Trademark Office before the Patent Trial and Appeal Board, Case No. IPR2014-00529.
Decision Denying Institution of Inter Partes Review of U.S. Pat. No. 7,921, 320, entered Sep. 29, 2014, in *Kinetic Technologies, Inc.* v. *Skyworks Solutions, Inc.*, United States Patent and Trademark Office before the Patent Trial and Appeal Board, Case No. IPR2014-00530.
Decision Institution of Inter Partes Review, entered Oct. 23, 2014, in *Kinetic Technologies, Inc.* v. *Skyworks Solutions, Inc.*, United States Patent and Trademark Office before the Patent Trial and Appeal Board, Case No. PR2014-00690, U.S. Pat. No. 8,539,275.
Declaration of Counsel Jon Michaelson in Support of Motion for Summary Judgment, Exhibit 1, filed Jan. 9, 2015, in *Advanced Analogic Technologies, Inc.* v. *Kinetic Technologies, Inc.*, Case No. 3:14-CV-00010 in the United States District Court for the Northern District of California.
Declaration of David Alan Brown in Support of Patent Owner's Response to Petition for Inter Partes Review, executed Jan. 15, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2033.
Declaration of John Sung K. So in Support of Patent Owner's Response to Petition for Inter Partes Review, executed Jan. 13, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2029.
Declaration of Kenneth K. Lee in Support of Patent Owner's Response to Petition for Inter Partes Review, executed Jan. 13, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2031.
Declaration of Kevin P. D'Angelo in Support of Patent Owner's Response to Petition for Inter Partes Review, executed Jan. 13, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2028.
Declaration of Michelle E. Armond in Support of Plaintiff Skyworks Solutions, Inc.'s Opening Claim Construction Brief, filed Nov. 10, 2014, in *Skyworks Solutions, Inc.* v. *Kinetic Technologies, Inc.*, Case No. 3:14-CV-00010 in the United States District Court for the Northern District of California.
Declaration of Nader Bagherzadeh, Ph.D., in Support of Patent Owner's Response to Petition for Inter Partes Review, executed Jan. 14, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2030.
Declaration of Prasant Mohapatra, Ph.D., executed Mar. 21, 2014, regarding U.S. Pat. No. 7,921,320, in *Kinetic Technologies, Inc.* v. *Skyworks Solutions, Inc.*, United States Patent and Trademark Office before the Patent Trial and Appeal Board, Kinetic Technologies, Inc. Exhibit 1008.
Declaration of Prasant Mohapatra, Ph.D., executed Mar. 21, 2014, regarding U.S. Pat. No. 7,921,320, in *Kinetic Technologies, Inc.* v. *Skyworks Solutions, Inc.*, United States Patent and Trademark Office before the Patent Trial and Appeal Board, Kinetic Technologies, Inc. Exhibit 1012.
Declaration of Prasant Mohapatra, Ph.D., executed Mar. 21, 2014, regarding U.S. Pat. No. 8,539,275, in *Kinetic Technologies, Inc.* v. *Skyworks Solutions, Inc.*, United States Patent and Trademark Office before the Patent Trial and Appeal Board, Kinetic Technologies, Inc. Exhibit 1008.

Declaration of Richard K. Williams in Support of Patent Owner's Response to Petition for Inter Partes Review, executed Jan. 14, 2015, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275, Skyworks Exhibit 2032.
Declaration of Scott Kolassa in Support of Defendant Kinetic Technologies Inc.'s Responsive Claim Construction Brief, filed Nov. 24, 2014, in *Skyworks Solutions, Inc.* v. *Kinetic Technologies, Inc.*, Case No. 3:14-CV-00010 in the United States District Court for the Northern District of California.
Declaration of Todd E. Reimund, executed Nov. 12, 2014, Kinetic Exhibit 1012 in Case IPR 2014-00690.
Defendant Kinetic Technologies Inc.'s Answer to Plaintiffs First Amended Complaint for Patent Infringement, filed Apr. 16, 2014, in *Skyworks Solutions, Inc.* v. *Kinetic Technologies, Inc.*, Case No. 3:14-CV-00010 in the United States District Court for the Northern District of California.
First Amended Complaint for Patent Infringement, filed Oct. 25, 2013, in *Skyworks Solutions, Inc.* v. *Kinetic Technologies, Inc.*, Case No. 1:13-CV-10655 in the United States District Court for the District of Massachusetts.
Joint Claim Construction and Prehearing Statement Pursuant to Patent L.R. 4-3, Exhibit A, filed Nov. 30, 2009, in *Advanced Analogic Technologies, Inc.* v. *Kinetic Technologies, Inc.*, Case No. 3:09-CV-01360 in the United States District Court for the Northern District of California.
Joint Claim Construction and Prehearing Statement Pursuant to Patent L.R. 4-3, filed Aug. 22, 2014, in *Skyworks Solutions, Inc.* v. *Kinetic Technologies, Inc.*, Case No. 3:14-CV-00010 in the United States District Court for the Northern District of California.
Joint Claim Construction and Prehearing Statement Pursuant to Patent L.R. 4-3, filed Nov. 30, 2009, in *Advanced Analogic Technologies, Inc.* v. *Kinetic Technologies, Inc.*, Case No. 3:09-CV-01360 in the United States District Court for the Northern District of California.
Kinetic Technologies Inc.'s Responsive Claim Construction Brief, filed Nov. 24, 2014, in *Skyworks Solutions, Inc.* v. *Kinetic Technologies, Inc.*, Case No. 3:14-CV-00010 in the United States District Court for the Northern District of California.
Kinetic Technologies, Inc.'s Exhibit No. Kap-11, Counter Example, Prior Art for Element A.
Kinetic Technologies, Inc.'s Exhibit No. Kap-16, Affidavit of Chun Lu in Support of Counter Simulation.
Kinetic Technologies, Inc.'s Updated Exhibit List, served on Nov. 19, 2014 via Email, in *Kinetic Technologies, Inc.* v. *Skyworks Solutions, Inc.*, United States Patent and Trademark Office before the Patent Trial and Appeal Board, Case No. IPR2014-00690, U.S. Pat. No. 8,539,275.
Kinetic's Answer and Counterclaims to First Amended Complaint, filed Aug. 7, 2009, in *Advanced Analogic Technologies, Inc.* v. *Kinetic Technologies, Inc.*, Case No. 3:09-CV-01360 in the United States District Court for the Northern District of California.
LTC News for Immediate Release, "ThinSOT™ White LED Driver Delivers High Efficiency", Low Noise, Kinetic Exhibit 1013 in Case IPR 2014-00690.
Mano, Morris M., Digital Design ($2^{nd}$ ed.), 1991, Prentice-Hall, Inc., Englewood Cliffs, NJ, 531 pages.
Mano, Morris M., Digital Design ($3^{rd}$ ed.), 2002, Prentice-Hall, Inc., Upper Saddle River, NJ, 534 pages.
Papers from Patent File Wrapper of Chinese Patent Application Serial No. 03805462.0.
Bryan Legates, "Constant-Current DC/DC Converter Drives White LEDs with 80% Efficiency," Linear Technology Magazine (May 2001).
Linear Technology LT1932 Constant-Current DC/DC LED Driver Data Sheet (2001).
McIntyre Sr., Steve et al., "Automotive Electronics: The Future?," Automotive Engineering, vol. 97, No. 8, Aug. 1989, pp. 26-32.

* cited by examiner

EN/SET

Operational state

SINGLE WIRE SERIAL INTERFACE UTILIZING COUNT OF ENCODED CLOCK PULSES WITH RESET

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD OF THE INVENTION

The present invention relates generally to control interfaces for integrated circuits and other devices. More particularly, the present invention includes a single wire serial interface that may be used to control power ICs and other devices.

BACKGROUND OF THE INVENTION

In power IC applications, an interface generally serves to manage functions such as power level, or on and off switching. In the load switch power IC case, the IC either delivers power to a subsystem or not depending on the state of the on/off pin. In a more complex power supply controller, the regulated output voltage is set by a more complex interface such as an integrated 5-pin digital to analog interface. When many subsystems exist within the same system, an even more complex interface, such as the SMBUS interface may be implemented.

The complex power IC can easily afford a multi-pin control interface, since it is already in a large package, and has sufficient functional density. The stand-alone power management function cannot normally offer a complex control interface due to die size or package size constraints. Still there are cases where this type of control is desirable. For instance, it may be desirable to vary a current limit over different load scenarios. However, few pins are available for control of the simple load switch because most of the pins are used by the power function, and there is no board space or budget for a larger package. Some functionality can be added by means of an analog interface, but since most applications are controlled by a microprocessor, a digital interface is easiest to implement and most cost effective. A serial interface is efficient, but common simple serial interfaces such as 3-wire or 2-wire require too many pins. Complex serial interfaces such as SMBUS are generally too complex and expensive to merit implementation for the stand-alone power management function.

For these reasons and others, there is a need for an interface that may be used to control stand-alone power and other IC types. Ideally, this interface would be able to accommodate a wide variety of control needs and be scaleable to many levels of complexity. Minimal pin use is also desirable, with the ideal being use of a single pin that may optionally be shared with another function.

SUMMARY OF THE INVENTION

An aspect of the present invention provides a single wire serial interface that may be used to control stand-alone power ICs and other devices. For this aspect, an IC is configured to include a sensing circuit, a counter, and a ROM or similar decoder. The sensing circuit monitors the voltage present at one of the IC pins. Typically, this will be the on/off pin and is referred to as the EN/SET pin. The sensing circuit determines whether or not the voltage at the EN/SET pin is high, low, or toggling.

When the voltage at the EN/SET pin is toggling the counter is enabled. This causes the counter to count the rising edge of each clock pulse sent to the EN/SET pin. Holding the voltage at the EN/SET pin high causes the counter to stop counting and maintain its value. Holding the voltage at the EN/SET pin low for more than a preset timeout period causes the counter to reset to zero.

The ROM contains a total of 2.sup.n words of m bits. Each m-bit word corresponds to one control state for the IC. The output of the counter is an address within the ROM selecting a particular m-bit word and control state. For simple functions, the counter can be only a few bits, in which case the counter outputs can be directly decoded in logic without the complexity of a ROM.

Another aspect of the present invention is an LED current source IC incorporating the single wire serial interface. The LED current source includes at least one current output and one EN/SET input. For a representative implementation, the ROM includes a total of thirty-two (32) words. Each word corresponds to an output level for the one or more current outputs. The output levels are preferably configured as a logarithmic scale, yielding two decades of output levels and LED luminosity.

Another aspect of the present invention is a load switch IC incorporating the single wire serial interface. The load switch includes one EN/SET input and n outputs where n is greater than one. For the case of the load switch, the bits in the counter may be used to directly control the state of the individual outputs (i.e., each bit determines the state of a corresponding output). This allows the ROM to be omitted from the load switch IC, simplifying its design. The bits in the counter yield a total of 2.sup.n different output configurations (i.e., all possible configurations).

Another aspect of the present invention is a current limited load switch IC incorporating the single wire serial interface. The current limited load switch includes one or more outputs and one EN/SET input. Each word in the ROM corresponds to a different current limit for the outputs.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 7 of the drawings. Like numerals are used for like and corresponding parts of the various drawings.

Single Wire Serial Protocol

An aspect of the present invention provides a single wire serial protocol that may be used to control ICs and other compatible devices. To use the single wire serial protocol, a device must support a series of different operational states or modes. For one example, a stand-alone power IC might be configured to support a range of different output levels. Typically, these output levels would progress in even increments from a no-power or off condition to a full power condition. Each different output level would define a particular operational state. The single wire serial protocol allows the operational states of compatible devices to be dynamically controlled. Thus, for the stand-alone power IC example, the single wire serial protocol would be used to select different operational states and associated output power levels.

Devices that support the single wire serial protocol are configured to receive an EN/SET signal. As shown by the timing diagram of FIG. 1, the EN/SET signal may be characterized as having three different waveforms. The first of these is a toggling waveform where the EN/SET signal is composed of a series of clock pulses. The second waveform is where the EN/SET signal is asserted to have a constant high value. The third waveform is where the EN/SET signal is asserted to have a constant low value.

The toggling waveform causes compatible devices to select particular operational states. The total number of clock pulses (or rising edges) determines the particular operational state that will be selected (i.e., four clock pulses selects the fourth operational state and so on). Additional clock pulses that exceed the number of operational states supported by a compatible device will generally cause the count to rollover and start again with the first operational state.

Figure 1:
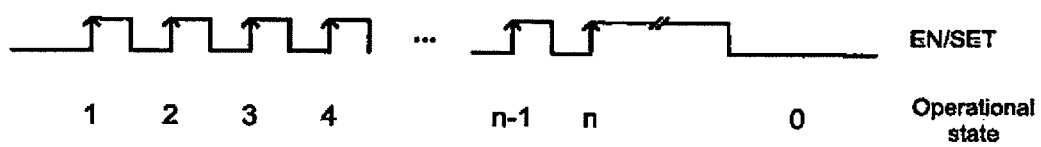
FIG. 1 is a timing diagram illustrating the use of the single wire protocol according to one aspect of the present invention.

The constant high waveform causes compatible devices to maintain their previously selected operational states. As shown in FIG. 1, the current operational state may be continued for an arbitrary duration in this way.

The constant low waveform causes compatible devices to power off (or otherwise adopt a predefined configuration) after a pre-defined timeout period has elapsed. The timeout period allows compatible devices to distinguish between the constant low waveform and the shorter low portions of the toggling waveform. For a typical implementation, the timeout value is 400 μs with the EN/SET signal having a frequency in the range of 1 Mhz to 10 kHz. Higher and lower frequencies are also possible.

Single Wire Serial Interface

Figure 2:
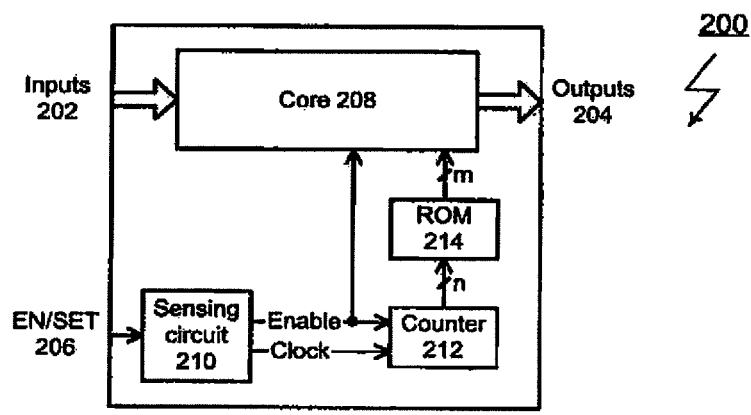
FIG. 2 is a block diagram showing an IC using a single wire serial interface according to one aspect of the present invention.

To use the single wire serial protocol, compatible devices must provide a single wire serial interface. For the purposes of illustration, FIG. 2 shows a block diagram of an IC (generally designated 200) configured to provide this interface. IC 200 includes one or more inputs 202 and one or more outputs 204. IC 200 also includes an EN/SET input 206 and a core portion 208. Core portion 208 is intended to be generally representative of the circuits that function to create outputs 204 using inputs 202 EN/SET input 206 is connected to a sensing circuit 210. Sensing circuit 210 monitors the EN/SET signal at EN/SET input 206 and determines if that voltage is constantly high, constantly low, or toggling. Based on this determination, sensing circuit 210 produces two signals: a Clock signal and an Enable signal. The Clock and Enable signals control the operation of a counter 212 having n bits. Counter 212 counts the rising transitions of the Clock signal whenever sensing circuit 210 asserts the Enable signal. Counter 212 resets whenever the Enable signal is not asserted.

Figure 3:
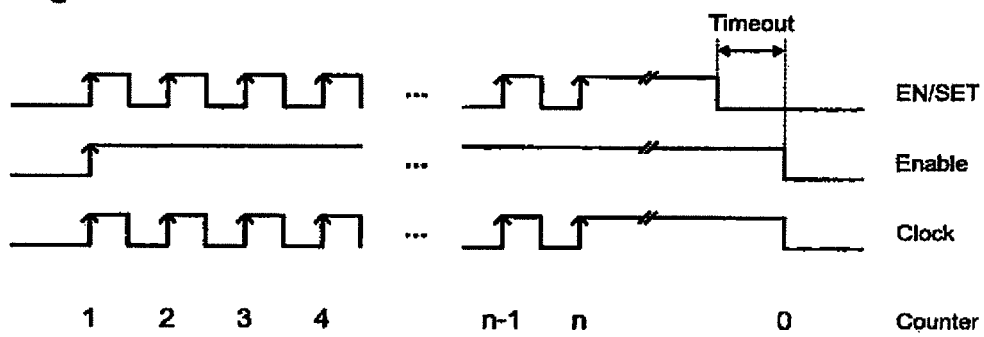
FIG. 3 is a timing diagram illustrating the use of the single wire serial interface of the IC of FIG. 2.

The relationship between the EN/SET signal and the Clock and Enable signals is shown in more detail in the timing diagram of FIG. 3. As shown in that figure, a rising transition of the EN/SET signal causes sensing circuit 210 to assert the Enable signal. Sensing circuit 210 holds the Enable signal high until the EN/SET signal transitions to a logical low state and remains in the low state until the predetermined timeout period has elapsed. The Enable signal acts to gate the Clock signal. As long as the Enable signal remains high, sensing circuit 210 forwards the EN/SET signal as the Clock signal. Counter 212 receives both the Clock and Enable signal. The first rising transition of the EN/SET signal raises the Enable signal and causes the EN/SET signal to be forwarded as the Clock signal. Counter 212 responds by increasing its value to one. Subsequent rising transitions causes Counter 212 to increment its value to two, three and so on. Counter 212 resets to zero when sensing circuit 210 transitions the Enable signal to a low value.

The n output bits of counter 212 control a ROM 214. ROM 214 has a total of 2.sup.n words, each having m bits. Each m-bit word corresponds to one control state for IC 200. The n-bit output of counter 212 selects a particular m-bit word within ROM 214. The selected control state and Enable signal are passed to core portion 208. Core portion 208 is configured to adjust its operation to match the selected control state.

Sensing Circuit

Figure 4:
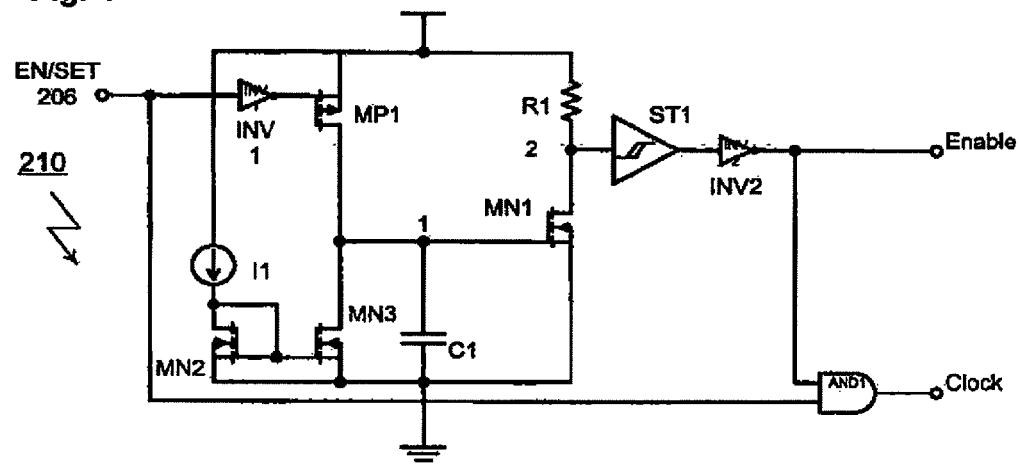
FIG. 4 is a diagram showing a sensing circuit appropriate for use in the IC of FIG. 2.

FIG. 4 shows a representative implementation for sensing circuit 210. As shown in that figure, sensing circuit 210 produces the Enable and Clock signals by timing the logic low period of the EN/SET signal. As long as the timeout period is not exceeded, the Enable signal will remain high, and the EN/SET signal will, feed through logic gate AND1 to become the Clock signal. In the described implementation, the timer consists of capacitor C1 and current source I1. Transistors MN2 and MN3 mirror current source I1. This linearly discharges capacitor C1 when the EN/SET signal is a logical low, and transistor MP1 is off. If the EN/SET signal remains in a logic low state long enough, capacitor C1 will discharge to a voltage that is less than the threshold of transistor MN1 and turn MN1 off. When MN1 is off, R1 pulls node "2" to the threshold of Schmit trigger ST1 and the Enable signal goes to a logic low state. As long as the EN/SET signal remains low for a period less than the timeout period, the Enable signal will remain in a logic high state. The timeout period is dominated by the power supply voltage, the threshold of transistor MN1 ($V_{tMN1}$), the value of capacitor C1, and the magnitude of current source I1, given by:

$$\text{Timeout} = C^*(V_{CC} - V_{tmN1})/I1$$

Typical values of C1=10 pF, Vcc=5 v, $V_{tMN1}$=1 v and I1=0.1 μA yield a timeout period of 400 μs. Sensing circuit 210 can respond to a 400 ns signal of the EN/SET signal. As a result, it is able to differentiate between the EN/SET signal as Clock and EN/SET signal as Enable. A typical application can be designed around a range of EN/SET frequencies between 1 Mhz to 10 kHz, or slower if desired.

Latched Single Wire Serial Interface

Devices that implement the just described single wire serial interface select a new control state each time a rising edge of a clock pulse is received. One result is that compatible devices progressively select each control state in sequence until the desired control state is reached. So, selecting the eighth control state means that compatible devices will progressively select control states one through seven before finally selecting the eighth (desired) control state. For some devices this behavior is acceptable or even desirable. This can be true, for example where the device is a current source where progressively increasing output can be benign or even useful. In other cases, selection of intermediate control states may have unwanted side effects. This could be true for the case of the multiple load switch that is described below.

Figure 5:
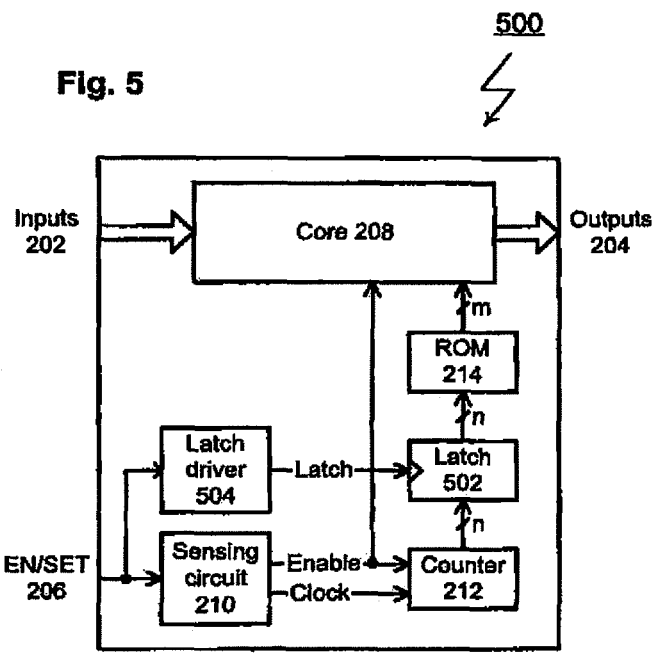
FIG. 5 is a block diagram showing an IC using a latched implementation of single wire serial interface according to one aspect of the present invention.

FIG. 5 shows a block diagram of an IC (generally designated 500) that uses an implementation of the single wire serial interface that eliminates intermediate control states. IC 500 includes the majority of components previously described for FIG. 2 and IC 200. In this case, the output of counter 212 is passed through a latch 502 before reaching ROM 214. Latch 502 is controlled by a Latch signal generated by a latch driver circuit 504.

Figure 6:
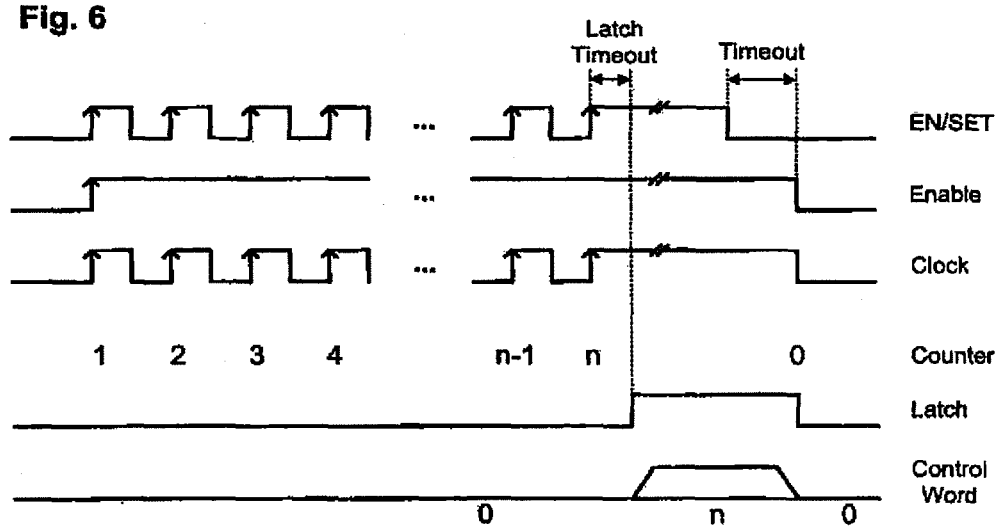
FIG. 6 is a timing diagram illustrating the use of the single wire serial interface of the IC of FIG. 5.

The relationship between the EN/SET, Clock, Enable and Latch signals is shown in FIG. 6. As shown, the Latch signal remains low until the EN/SET signal has been maintained in a high state for a duration that exceeds a predetermined latch timeout period. Holding the EN/SET signal high for longer than the latch timeout period causes latch driver 504 to assert the Latch signal. This, in turn causes latch 502 to forward the accumulated value of counter 212 to ROM 214. The result is that counter 212 is prevented from forwarding intermediate control states until the EN/SET signal has been asserted high after the train of clock pulses has been completed.

Latch Driver Circuit

Figure 7:
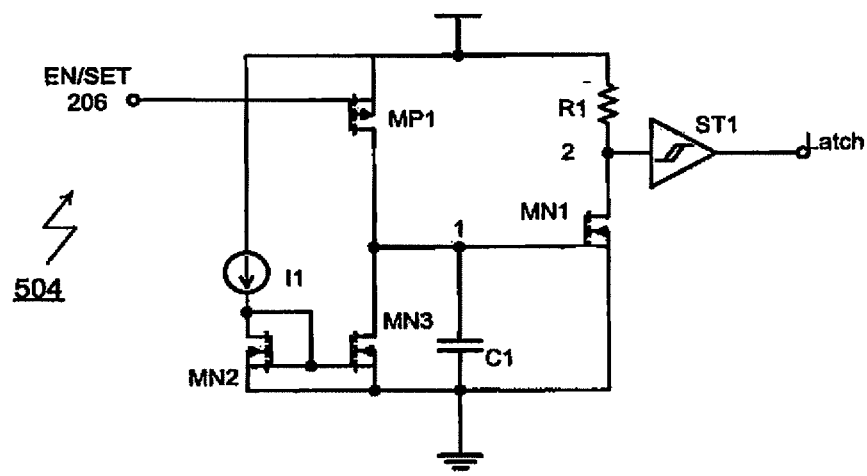
FIG. 7 is a diagram showing a latch driver circuit appropriate for use in the IC of FIG. 2.

FIG. 7 shows a representative implementation for latch driver 504. As shown in that figure, latch driver 504 produces the Latch signal by timing the logic high period of the EN/SET signal. As long as the EN/SET signal is high for less than the latch timeout period, the Latch signal remains low. In other described implementation, the timer consists of capacitor C1 and current source I1. Transistors MN2 and MN3 mirror current source I1. This linearly discharges capacitor C1 when the EN/SET signal is a logical high, and transistor MP1 is off. If the EN/SET signal remains in a logic high state long enough, capacitor C1 will discharge to a voltage that is less than the threshold of transistor MN1 and turn MN1 off. When MN1 is off, R1 pulls node "2" to the threshold of Schmit trigger ST1 and the Latch signal goes to a logic high state. As long as the EN/SET signal remains high for a period less than the latch timeout period, the Latch signal will remain in a logic low state. The latch timeout period is dominated by the power supply voltage, the threshold of transistor MN1 ($V_{tMN1}$), the value of capacitor C1, and the magnitude of current source I1, given by:

$$\text{Latch Timeout} = C^*(V_{CC} - V_{tMN1})/I1$$

Typical values of C1=10 pF, Vcc=5 v, $V_{tMN1}$=1 v and I1=0.1 µA yield a latch timeout period of 400 µs. Latch driver 504 can respond to a 400 ns signal of the EN/SET signal. As a result, it is able to differentiate between the EN/SET signal as Clock and EN/SET signal as Latch. A typical application can be designed around a range of EN/SET frequencies between 1 Mhz to 10 kHz, or slower if desired.

Decoder

ROM 214 provides a mapping between the EN/SET signal and associated control states for IC 200. In some cases, there may be relatively few control states. In other cases, the mapping may be defined functionally. In these cases, it is possible to replace ROM 214 with a decoder. This allows the outputs of counter 212 to be directly decoded in logic without the complexity of a ROM.

LED Driver

The white LED has become the backlight source of choice for small displays used in products such as cell phones that typically use a lithium ion battery for power. The white LED is an excellent light source. However, it requires from 3.6 to 4.1 volts of forward bias voltage to conduct current and emit light. Since the lithium ion battery runs between 4.1 and 2.9 volts, a regulated boosted voltage must be generated to power the LED. Four LED's are typically used in a display; either in a serial or a parallel arrangement.

The lowest cost solution is to drive the four LED's in parallel with a charge pump. The higher cost solution is to drive the four LED's in series with a DC/DC boost converter capable of boosting the lithium ion battery up to four times the forward voltage of the LEDs (e.g. 4.times.4.1=16.4 volts). The DC/DC boost converter is higher cost due to the cost and size of the required inductor, but since the LED is really a current mode device, the performance is better because all of the LED's in series will be biased with the same current and share the same luminosity.

The charge pump solution is attractive because small low cost capacitors can be used to develop a voltage of up to 1.5 or 2 times the battery voltage. The disadvantage to the charge pump solution is that the resulting voltage must be sensed as a current for brightness control of the LED. A single voltage can drive multiple LED's, however only one LED is used as the current reference. This is achieved by adding a current setting and sensing resistor in series with it. The additional LED's have a matching resistor in series, but unless their forward voltages match that of the reference LED, they will have substantially different currents and, as such, brightness levels. A better solution would have parallel current outputs for driving the LED with a current. In this manner, all LED's would have the same bias current and luminosity. The parallel outputs however, require more pins and a larger package that is a significant disadvantage.

Another issue is brightness control. Brightness control can be performed by setting a reference current and leaving it constant, or by applying some control means to the DC/DC converter to obtain a different output voltage or current. One way to control the brightness of an LED is to simply turn it on and off at a higher frequency than the human eye can detect, and pulse width modulate (PWM) the on-time. An easier system solution would be an interface whereby a current control is input to the DC/DC converter to control the output current. This can be accomplished either by a control voltage or a digital interface. A simple solution is a digital interface, but to have enough resolution, or a large enough range, many bits of control are required. This leads again to higher undesirable pin count.

Since the human eye senses brightness logarithmically, a useful digital control would result in a logarithmic brightness scale. A logarithmic scale that adequately covers two decades of luminosity requires at least 5-bits or 32 levels.

An aspect of the present invention provides an LED driver that effectively meets all of these requirements. The LED driver is preferably configured as a 12-pin device with four LED current source outputs. The LED driver also includes an EN/SET input that supports the single wire serial protocol described above. The EN/SET input functions as the on/off control as well as the brightness control. Internally, the LED driver includes a five-bit counter and a thirty-two word ROM. The control states included in the ROM are configured to provide logarithmically increasing levels of luminosity. The counter and ROM are scaleable to any number of levels beyond or below 32.

Multiple Load Switch

Another aspect of the present invention is a load switch IC incorporating the interface described in the preceding paragraphs. For an eight-pin package, the load switch includes one EN/SET input, five outputs, a power input and a ground input. For the case of the load switch, the bits in the counter may be used to directly control the state of the individual outputs (i.e., each bit determines the state of a corresponding output). This allows the ROM to be omitted from the load switch IC, simplifying its design. The bits in the counter yield a total of $2^5$ or thirty-two different output configurations (i.e., all possible configurations). If the load switches are very slow to respond, the single wire serial interface can be operated at a much higher frequency than the switches can respond and the outputs will be well behaved. In the case where the switches are fast, an addition must be made whereby the value clocked into the single wire serial interface is not latched until the clocking has stopped.

Current Limited Load Switch with Configurable Current Limit

Another aspect of the present invention is a current limited load switch IC incorporating the interface described in the preceding paragraphs. The current limited load switch includes one or More outputs and one EN/SET input. Each word in the ROM corresponds to a different current limit for the one or more outputs. The current limited load switch is disabled a predetermined period after the EN/SET transitions to the low state.

Although particular embodiments of the present invention have been shown and described, it will be apparent to those skilled in the art that changes and modifications may be made without departing from the present invention in its broader aspects, and therefore, the appended claims are to encompass within their scope all such changes and modifications that fall within the true scope of the present invention.

What is claimed is:

1. A power integrated circuit for controlling a light source, the power integrated circuit comprising:
    a counter that generates a count value based on pulses encoded in a signal received at a single input of the power integrated circuit;
    output circuitry that outputs, via at least one output of the power integrated circuit, at least one lighting control state utilized to control the light source based at least in part on the count value; and
    sensing circuitry that determines whether the signal is high or low so that (i) the at least one lighting control state is maintained while the signal is high, and (ii) the count value is reset in response to the signal being low for a period that exceeds a predetermined timeout value, the predetermined timeout value being longer than a width of one of the pulses.

2. The power integrated circuit of claim 1 further comprising latch circuitry that maintains a prior control state.

3. The power integrated circuit of claim 1 further comprising latch circuitry that maintains a prior control state until the count value has been accumulated.

4. The power integrated circuit of claim 1 wherein the output circuitry includes current control circuitry that controls at least in part a current associated with the at least one output.

5. The power integrated circuit of claim 1 wherein the output circuitry includes voltage control circuitry that controls at least in part a voltage associated with the at least one output.

6. The power integrated circuit of claim 1 wherein the output circuitry includes LED driver circuitry that controls at least in part an LED current source associated with the at least one output.

7. The power integrated circuit of claim 1 wherein the output circuitry provides a constant output based at least in part on the signal being high.

8. The power integrated circuit of claim 1 wherein the output circuitry includes boost converter control circuitry that controls at least in part boosting of the at least one output.

9. A method for controlling a light source with a power integrated circuit, the method comprising:
    generating a count value based on pulses encoded in a signal received via a single input of the power integrated circuit;
    outputting via at least one output of the power integrated circuit, at least one lighting control state utilized to control the light source based at least in part on the count value;
    maintaining the at least one lighting control state while the signal is at a high level; and
    resetting the count value in response to the signal being low for a period that exceeds a predetermined timeout value, the predetermined timeout value being longer than a width of one of the pulses.

10. The method of claim 9 wherein the outputting includes controlling at least in part a current associated with the at least one output.

11. The method of claim 9 wherein the outputting includes controlling at least in part a voltage associated with the at least one output.

12. The method of claim 9 wherein the outputting controls at least in part an LED current source associated with the at least one output.

13. The method of claim 9 wherein the at least one output controls at least in part, boosting a signal provided to the light source.

14. A method for controlling a light source using a power integrated circuit, the method comprising:
    receiving at a single input of the power integrated circuit a signal that is constantly high, constantly low, or toggling with a series of pulses, the series of pulses encoding a desired lighting control state;
    outputting via at least one output of the power integrated circuit a respective desired lighting control state;
    maintaining the respective desired lighting control state while the signal is constantly high for a duration in which the respective desired lighting control state is to remain unchanged; and
    resetting the desired lighting control state when the signal is constantly low for a duration that exceeds a predefined timeout period, the predefined timeout period being longer than a width of one of the series of pulses.

15. A power integrated circuit for controlling a light source, the power integrated circuit comprising:
    a counter that generates a count value based on pulses encoded in a signal received at a single input of the power integrated circuit;
    a core portion configured to output via at least one output of the power integrated circuit a series of lighting control states, each lighting control state defining operational parameters for a light source based at least in part on the count value; and sensing circuitry that determines whether the signal is high or low so that (i) at least one of the series of lighting control states is maintained while the signal is high, and (ii) the count value is reset in response to the received signal being low for a period that exceeds a predetermined timeout value, the predetermined timeout value being longer than a width of one of the pulses.

16. The power integrated circuit of claim 15 further comprising a latch for maintaining a prior control state.

17. The power integrated circuit of claim 15 further comprising a latch for maintaining a prior control state until the count value has been accumulated.

18. The power integrated circuit of claim 15 further comprising current control circuitry that controls at least in part a current associated with the at least one output that varies based at least in part on the count value.

19. The power integrated circuit of claim 15 further comprising voltage control circuitry that controls at least in part a voltage associated with the at least one output that varies based at least in part on the count value.

20. The power integrated circuit of claim 15 further comprising LED driver circuitry that controls at least in part an LED current source associated with the at least one output.

21. The power integrated circuit of claim 15 further comprising LED driver circuitry that controls at least in part at least four LED current sources.

22. The power integrated circuit of claim 15 further comprising boost converter control circuitry that controls at least in part boosting of the at least one output.

23. The power integrated circuit of claim 15 further comprising a constant output based at least in part on the signal being high.

24. A power integrated circuit for controlling a light source, the power integrated circuit comprising:
a counter that generates a count value based on pulses encoded in a signal received at a single input of the power integrated circuit, the signal having a first level and a second level, each of the pulses including a transition from the first level to the second level and a transition from the second level to the first level;
output circuitry that outputs, via at least one output of the power integrated circuit, at least one lighting control state utilized to control the light source based at least in part on the count value; and
sensing circuitry that determines whether the signal is at the first level or the second level so that (i) the at least one lighting control state is maintained while the signal is at the second level, and (ii) the count value is reset in response to the signal being at the first level for a period that exceeds a predetermined timeout value after a transition from the second level to the first level, the predetermined timeout value being longer than a width of one of the pulses.

25. The power integrated circuit of claim 24 wherein the output circuitry includes current control circuitry that controls at least in part a current associated with the at least one output.

26. The power integrated circuit of claim 24 wherein the output circuitry includes voltage control circuitry that controls at least in part a voltage associated with the at least one output.

27. The power integrated circuit of claim 24 wherein the output circuitry includes LED driver circuitry that controls at least in part an LED current source associated with the at least one output.

28. The power integrated circuit of claim 24 wherein the output circuitry includes boost converter control circuitry that controls at least in part boosting of the at least one output.

29. The power integrated circuit of claim 24 wherein the output circuitry provides a constant output based at least in part on the signal being at the second level.

* * * * *